(12) United States Patent
Lea

(10) Patent No.: US 11,547,932 B2
(45) Date of Patent: Jan. 10, 2023

(54) COMPANION DEVICE AIDED GAME CONTROLLER PAIRING

(71) Applicant: Microsoft Technology Licensing, LLC, Redmond, WA (US)

(72) Inventor: Perry Victor Lea, Eagle, ID (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/330,204

(22) Filed: May 25, 2021

(65) Prior Publication Data

US 2022/0379199 A1 Dec. 1, 2022

(51) Int. Cl.
| | |
|---|---|
| *A63F 13/26* | (2014.01) |
| *A63F 13/235* | (2014.01) |
| *A63F 13/31* | (2014.01) |
| *A63F 13/327* | (2014.01) |
| *A63F 13/216* | (2014.01) |

(Continued)

(52) U.S. Cl.
CPC .......... *A63F 13/235* (2014.09); *A63F 13/216* (2014.09); *A63F 13/26* (2014.09); *A63F 13/31* (2014.09); *A63F 13/327* (2014.09); *A63F 13/33* (2014.09); *H04W 12/50* (2021.01); *A63F 2300/1031* (2013.01)

(58) Field of Classification Search
None
See application file for complete search history.

(56) References Cited

U.S. PATENT DOCUMENTS

| 8,700,819 B2 | 4/2014 | Dalal et al. |
| 2007/0101136 A1 | 5/2007 | Lai et al. |

(Continued)

FOREIGN PATENT DOCUMENTS

| WO | 2014171870 | 10/2014 |
| WO | 2020190559 A1 | 9/2020 |

OTHER PUBLICATIONS

"The Razer Kishi is an Excellent Controller for Project xCloud Gaming", Retrieved from: https://www.aivanet.com/2020/06/the-razer-kishi-is-an-excellent-controller-for-project-xcloud-gaming/, Jun. 12, 2020, 4 Pages.

(Continued)

*Primary Examiner* — Damon J Pierce
(74) *Attorney, Agent, or Firm* — Alleman Hall Creasman & Tuttle LLP

(57) ABSTRACT

A game controller is configured to selectively pair with a companion device using a first communication protocol and one or more gaming systems using a second communication protocol. The game controller is configured to send a pairing request to the companion device using the first communication protocol based on companion-device pairing data stored in a storage subsystem of the game controller. The game controller is configured to send a pairing request to a last-paired gaming system with which the game controller last paired using the second communication protocol based on gaming-system pairing data stored in the storage subsystem. Responsive to the game controller being unable to pair with the last-paired gaming system and while the game controller is paired with the companion device, the game controller is configured to send an error notification to the companion device using the first communication protocol.

20 Claims, 11 Drawing Sheets

(51) Int. Cl.
*H04W 12/50* (2021.01)
*A63F 13/33* (2014.01)

(56) References Cited

U.S. PATENT DOCUMENTS

| | | |
|---|---|---|
| 2013/0130800 A1 | 5/2013 | Sirilux et al. |
| 2015/0220250 A1 | 8/2015 | Nakata et al. |
| 2017/0142201 A1 | 5/2017 | Holmes |
| 2017/0312626 A1 | 11/2017 | Colenbrander |
| 2019/0321732 A1* | 10/2019 | Zimring ............... A63F 13/352 |
| 2020/0306625 A1 | 10/2020 | Palmer et al. |
| 2020/0336897 A1 | 10/2020 | Ledvina et al. |

OTHER PUBLICATIONS

Laidlaw, Zach, "How to Use a Nintendo Switch Pro Controller on an Android Phone or Tablet", Retrieved from: https://www.androidpolice.com/2020/08/22/how-to-use-a-nintendo-switch-pro-controller-on-an-android-phone-or-tablet/, Aug. 22, 2020, 7 Pages.
McWhertor, Michael, "Amazon Unveils New Cloud Gaming Service Luna", Retrieved from: https://www.polygon.com/2020/9/24/21454568/amazon-luna-cloud-gaming-service-channels-price-release-date, Sep. 24, 2020, 4 Pages.
"International Search Report and Written Opinion Issued in PCT Application No. PCT/US22/027745", dated Aug. 4, 2022, 14 Pages.

* cited by examiner

COMPANION DEVICE AIDED GAME CONTROLLER PAIRING

BACKGROUND

A game controller may pair with a gaming system using a communication protocol. In some examples, a game controller may pair with different gaming systems using different communication protocols. In some scenarios, multiple gaming systems may be available to pair with a game controller. In such a scenario, a typical game controller may pair with a gaming system having the highest communication signal strength of the available gaming systems.

SUMMARY

A game controller is configured to selectively pair with a companion device using a first communication protocol and one or more gaming systems using a second communication protocol. The game controller is configured to send a pairing request to the companion device using the first communication protocol based on companion-device pairing data stored in a storage subsystem of the game controller. The game controller is configured to send a pairing request to a last-paired gaming system with which the game controller last paired using the second communication protocol based on gaming-system pairing data stored in the storage subsystem. Responsive to the game controller being unable to pair with the last-paired gaming system and while the game controller is paired with the companion device, the game controller is configured to send an error notification to the companion device using the first communication protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
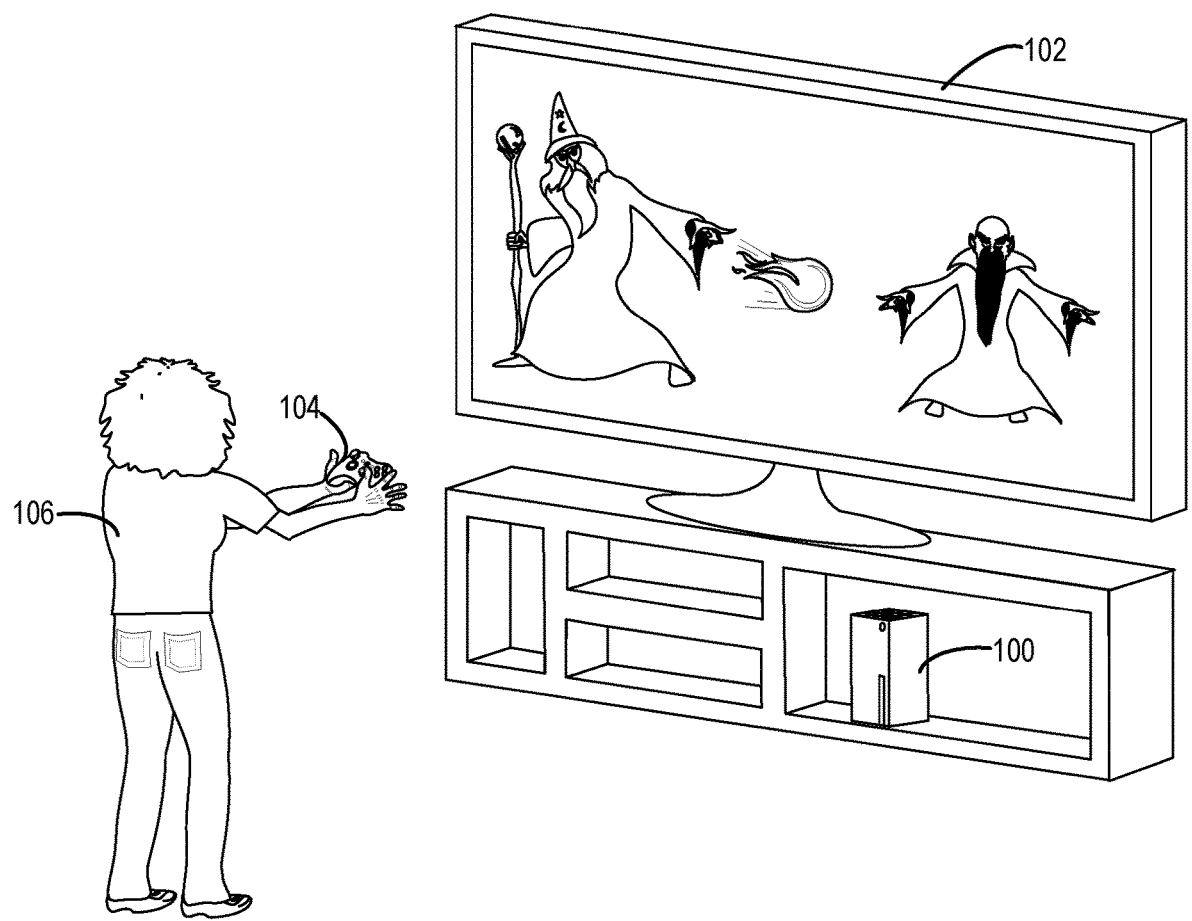
FIGS. 1A and 1B show different example scenarios in which a game controller pairs with different gaming systems.
Figure 1B:
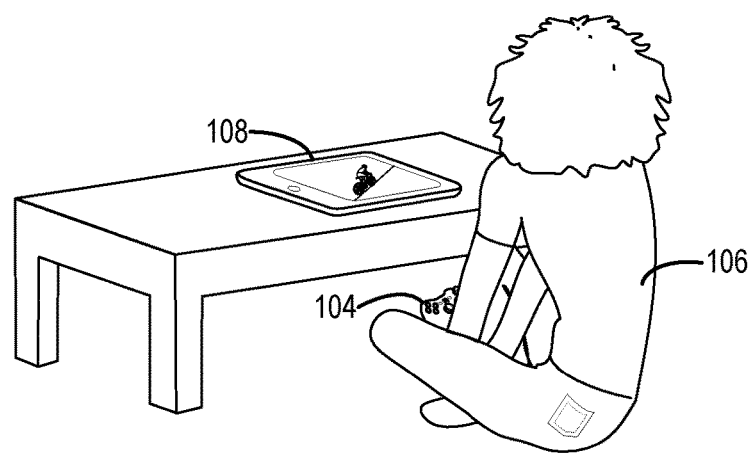

FIGS. 1A and 1B show different example scenarios in which a game controller pairs with different gaming systems. As used herein, the term "gaming system" may include one or more computing devices that may be configured to execute a video game, and the phrase "execute a video game" may include presenting video game video and/or audio whether the program that renders the game video and/or audio is locally or remotely located. In FIG. 1A, a gaming system in the form of a game console 100 executes a video game for visual presentation on a large-format display 102. A game controller 104 pairs with the game console 100 so that a user 106 may provide user input to the game console 100 to play the video game executed by the game console. As used herein, the terms "pair" and "pairing" refer to the process of establishing an initial linkage between computing devices to allow for communications between the computing devices using a specified communication protocol. In one example, the game controller 104 pairs with the game console 100 using a first communication protocol, such as a WIFI-based communication protocol (e.g., WIFI-direct).

In FIG. 1B, the user 106 desires to play a video game executed on a different gaming system in the form of a tablet computer 108. The game controller 104 pairs with the tablet computer 108 so that the user 106 may provide user input to the tablet computer 108 to play the video game. In one example, the game controller 104 pairs with the tablet computer 108 using a second communication protocol, such as the Bluetooth Low Energy (BLE) communication protocol. In some examples, the game controller 104 may be configured to pair with the game console 100 and/or the tablet computer 108 using either of the first or second communication protocols.

In some scenarios, multiple gaming systems may be available to pair with a game controller. Referencing the above example, the game console 100 and the tablet computer 108 may be available to pair with the game controller 104. In such a scenario, a typical game controller may be configured to pair with a gaming system having the highest communication signal strength of the different available gaming systems.

However, a user may desire to pair a game console with a different gaming system that does not necessarily have the highest communication signal strength. Referencing the above example, if the game console 100 has a higher communication signal strength than the tablet computer 108, then it may be unclear how the user can pair the game controller to the tablet computer 108, because such a typical game controller does not provide an intuitive way to pair with different gaming systems. Moreover, a typical game controller alone does not provide an easily observable indication that the game controller is paired with a particular gaming system.

Accordingly, the present description is directed to a game controller that is configured to pair with a wide variety of different gaming systems using different communication protocols with the aid of a companion device. The companion device may provide various features that aid a user in managing pairing of the game controller with the different gaming systems in an intuitive, straight-forward, and easily observable manner that a typical game controller alone would not be capable of providing.

Figure 2A:
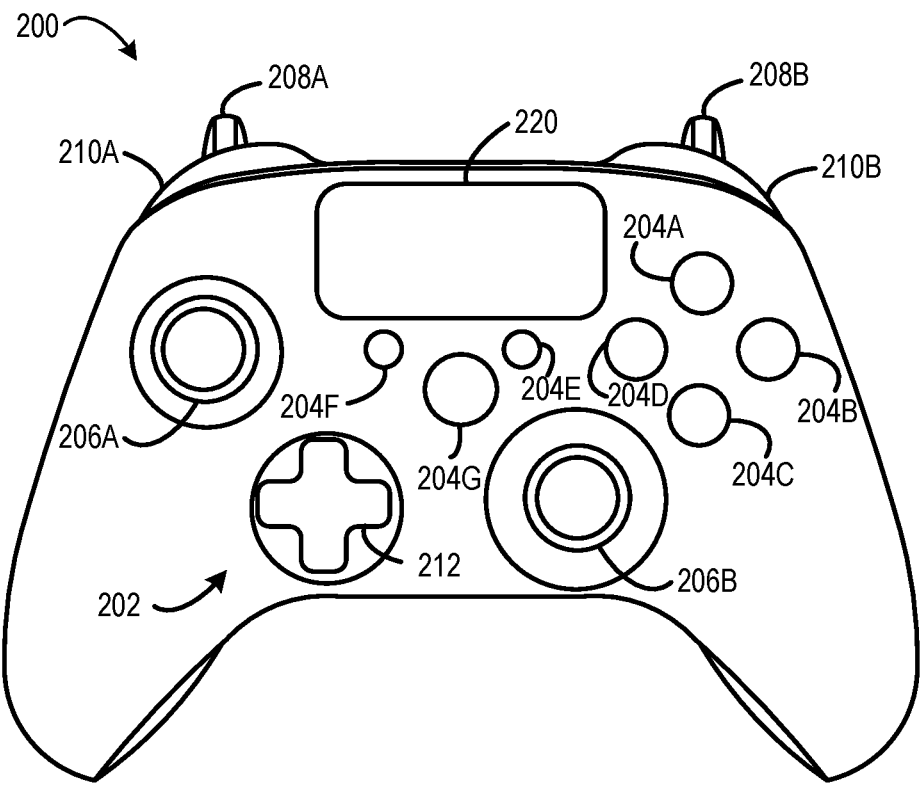
FIGS. 2A and 2B show an example game controller.
Figure 2B:
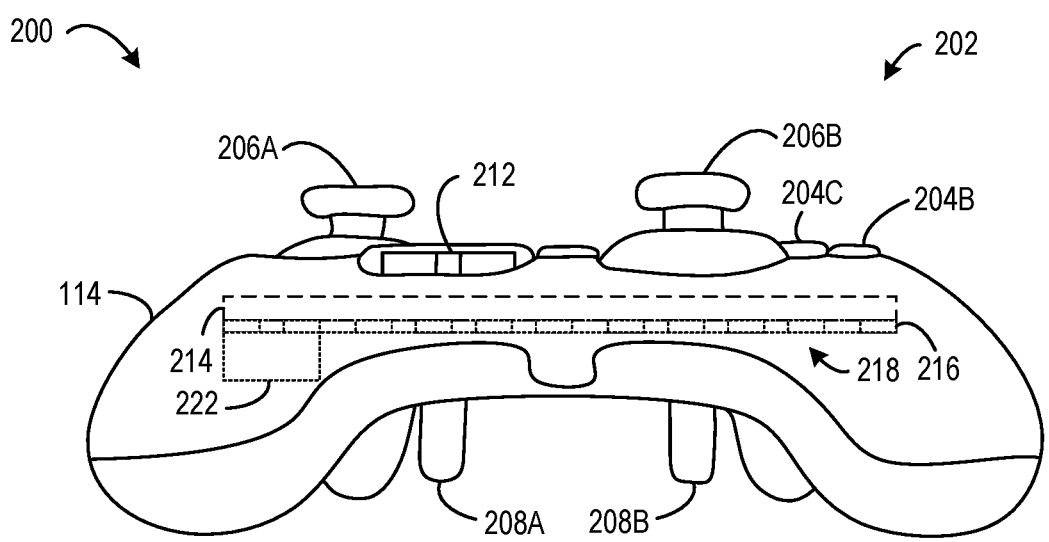

FIGS. 2A-2B show an example game controller 200. The game controller 200 may be configured to translate user input into control data that is sent to a gaming system that is paired with the game controller 200, such as a local gaming system 304 or another gaming system shown in FIG. 3. For example, the user input control data may be mapped to commands to control a video game, an application, or other operations executed by the gaming system. In some examples, the game controller 200 may be configured to map user input control data to video-game-specific or application-specific commands. In other examples, the gaming system may be configured to map user input control data to video-game-specific or application-specific commands.

The game controller 200 includes a plurality of controls 202 configured to interface with electronic input sensors 218 internal to the game controller 200 that generate control signals responsive to finger manipulation of the controls 202. In particular, the plurality of controls 202 includes a plurality of buttons 204 (e.g., 204A, 204B, 204C, 204D, 204E, 204F, 204G, 204H, and 204I), a plurality of joysticks 206 (e.g., a left joystick 206A and a right joystick 206B), a plurality of triggers 208 (e.g., a left trigger 208A and a right trigger 208B), a plurality of bumper buttons 210 (e.g., a left bumper button 210A and a right bumper button 210B), and a directional pad 212. The game controller 200 may include any number of controls, any type of controls, any number of electronic input sensors, and any type of electronic input sensors without departing from the scope of this disclosure.

The plurality of controls 204 may be coupled to one or more internal frames 214 in the game controller 200. One or more printed circuit boards 216 may be coupled to the frame(s) 214. The printed circuit board(s) 216 may include a plurality of electronic input sensors 218. Each electronic input sensor 218 may be configured to generate control signals responsive to interaction with a corresponding control 202. Non-limiting examples of electronic input sensors may include dome switches, tactile switches, Hall Effect sensors, potentiometers, and other electronic sensing components. Any suitable sensor may be implemented in the game controller 200 using a printed circuit board architecture or any other suitable architecture.

Each of the buttons 204 may be configured to activate a corresponding electronic input sensor 218 to generate an activate control signal responsive to being depressed (e.g., via finger manipulation). Each of the joysticks 206 may be configured to provide two-dimensional input that is based on a position of the joystick in relation to a default "center" position. For example, each of the joysticks 206 may interact with electronic input sensors in the form of potentiometers that use continuous electrical activity to provide an analog input control signal. Each of the triggers 208 may be configured to provide a variable control signal based on a position of the trigger relative to a default position. For example, as a trigger is pulled farther away from the default position a characteristic of the generated control signal may increase in magnitude.

The directional pad 212 may be configured to reside in a default posture when no touch force is applied to the directional pad 212. In the default posture, the directional pad 212 does not cause any of the plurality of electronic input sensors 218 to generate an activate control signal indicative of touch input. Further, the directional pad 212 may be configured to move from the default posture to a selected activation posture responsive to a touch force being applied to the directional pad 212. The selected activation posture may be one of a plurality of different activation postures that each generate a different activate control signal or combination of activate control signals by interfacing with different electronic input sensors.

Note that an activation signal produced by an electronic input sensor 218 when a corresponding control 202 is in an activation posture may be any signal that differs from a signal or lack thereof produced by the electronic input sensor 218 in the default posture. For example, in some implementations, the activation signal may correspond to a supply voltage (e.g., VDD) of the game controller 200 and the signal produced in the default state may correspond to a relative ground. (e.g., 0). In other implementations, the activation signal may correspond to a relative ground and the signal produced in the default state may correspond to the supply voltage of the game controller 200.

The game controller 200 includes a display 220 configured to visually present pairing and other status information that may aid a user in managing pairing of the game controller 200 with the different gaming systems. In some implementations, the display 220 may be omitted from the game controller 200. In some implementations, a display of a companion device that is paired with the game controller 200 may visually present pairing and other status information of the game controller 200.

The game controller 200 includes a micro-controller 222 coupled to the frame(s) 214. The micro-controller 222 may be configured to perform pairing operations with different gaming system as discussed in further detail below. Further, the micro-controller 222 may be configured to translate control signals generated by the plurality of electronic sensors 218 into user input control data that is sent to a gaming system that is paired with the game controller 200.

Figure 3:
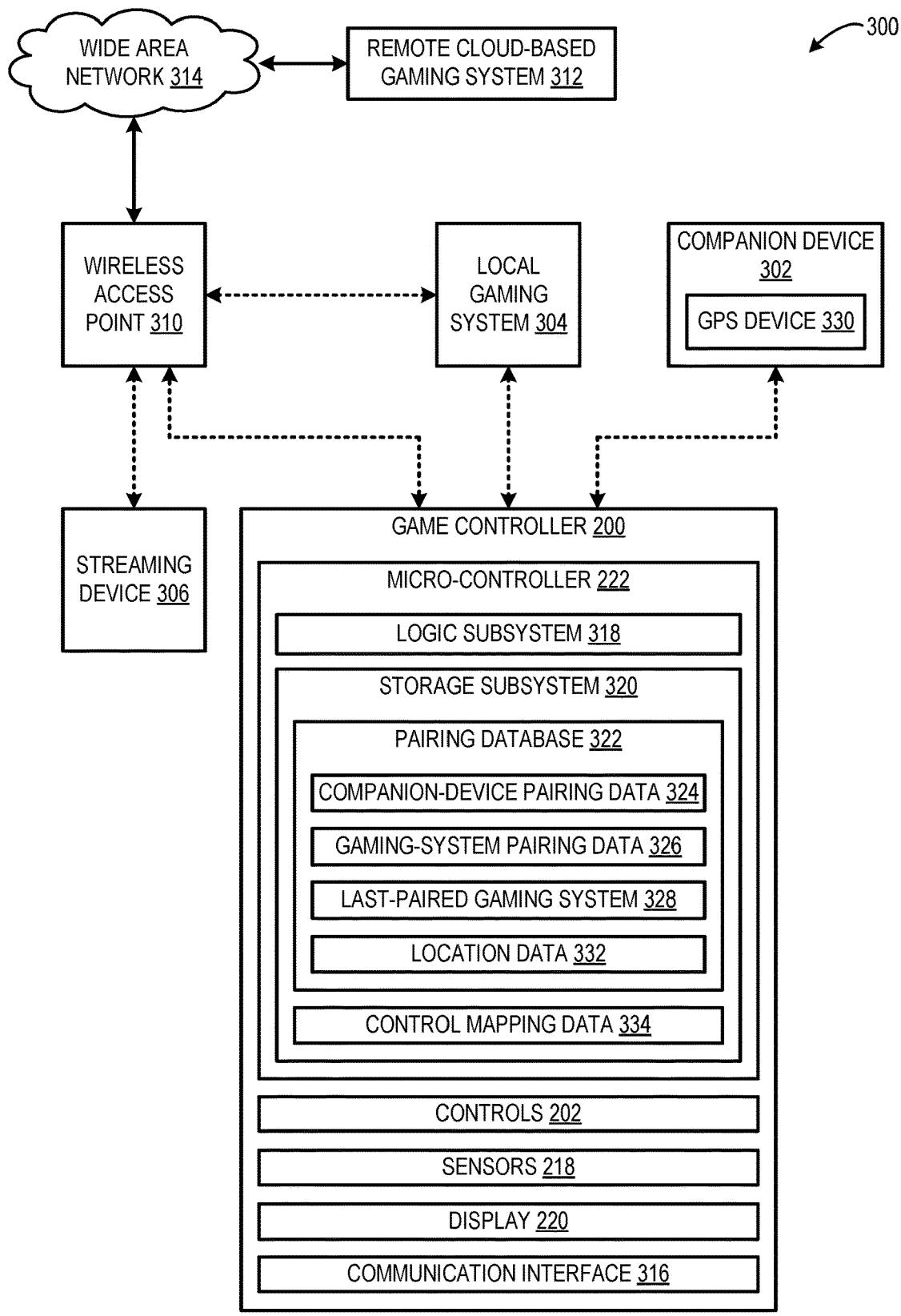
FIG. 3 shows an example computing environment including a game controller and a plurality of computing systems pairable with the game controller.

FIG. 3 show an example computing environment 300 including the game controller 200 and a plurality of computing systems pairable with the game controller 200. The plurality of computing systems includes a companion device 302, a local gaming system 304, a streaming device 306, a wireless access point (WAP) 310, and a remote cloud-based gaming system 312.

The game controller 200 may be configured to pair with the companion device 302 so that the companion device 302 may extend pairing functionality of the game controller 200. In particular, the companion device 302 may be configured to aid the game controller 200 in pairing with a gaming system that executes a video game with which the game controller 200 may provide user input for controlling or "playing" the video game. Typically, the companion device 302 may be separate from the gaming system that executes the video game. However, in some examples, the companion device may provide pairing functionality and execute a video game. In such an example, the companion device 302 may execute a distinct pairing application program that is separate and independent of execution of the video game on the companion device 302. For example, the companion device 302 may execute the pairing application program without necessarily executing any video game. The companion device 302 may be implemented as any suitable type of computing system that may be configured to aid with pairing of the game controller 200 with a gaming system including, but not limited to, a smart phone, a tablet computer, a virtual/augmented/mixed reality device, a desktop computer, a wearable computer, or some other suitable type of computer.

The local gaming system 304 may be configured to execute a video game. In some examples, the local gaming system 304 may be configured to execute an entirety of a video game locally "on-board" the local gaming system 304. In other examples, the local gaming system 304 may be configured to execute at least some aspects of the video game, and a remote computing system, such as the remote cloud-based gaming system 312, may be configured to execute at least some aspects of the video game. In this example, the local and remote gaming systems work in concert to execute the video game. The local gaming system 304 may be implemented as any suitable type of computing system that is configured to execute a video game including, but not limited to, a game console, a desktop computer, a laptop computer, a tablet computer, a smartphone, a large-format smart television, a wearable computer, a virtual/augmented/mixed reality device, an in-vehicle computer, a set-top-box computer, or some other suitable type of computer.

The streaming device 306 may be configured to receive video frames and corresponding synchronized audio data of a video game that is rendered by another gaming system. In other words, the streaming device 306 is configured to present a video game without actually rendering the video game locally on-board the streaming device 306. In some examples, the streaming device 306 may be paired or otherwise connected with the local gaming system 304 via the WAP 310 to receive rendered audio/video data of a video game executed by the local gaming system 304. In other examples, the streaming device 306 may be paired or otherwise connected with the remote cloud-based gaming system 312 via the WAP 310 to receive rendered audio/video data of a video game executed by the remote cloud-based gaming system 312.

The WAP 310 may be configured to enable local computing systems including the game controller 200, the companion device 302, the local gaming system 304, and the streaming device 306 to communicate with other remote computing systems including the remote cloud-based gaming system 312 via a wide area network (WAN) 314. The WAP 310 may be configured to support concurrent pairing/connections of multiple local computing systems with the WAN 314 to communicate with various remote computing systems. The WAP 310 may be configured to support any suitable communication protocol. In some examples, the WAP 310 may be configured to support multiple different communication protocols.

The remote cloud-based gaming system 312 may be configured to execute a video game and send the resulting rendered audio/video data to a local computing device via the WAN 314 and the WAP 310 for presentation. Additionally, the remote cloud-based gaming system 312 may be configured to receive user input control data from the game controller 200 via the WAP 310 as discussed in further detail below.

The game controller 200 includes the micro-controller 222, the plurality of controls 202, the electronic input sensors 218, the display 220, and a communication interface 316. The communication interface 316 may be configured to enable the game controller 200 to individually pair with various computing systems using different communication protocols.

Different communication protocols may provide different advantages. For example, lower-energy communication protocols, such as the BLE communication protocol, may prioritize low power consumption over speed, bandwidth, or range. Such lower-energy communication protocols may be employed by battery-powered devices to prolong battery life. In contrast, a device that is plugged in to a power source (e.g., power outlet) may employ a different communication protocol that prioritizes speed, bandwidth, range over low power consumption.

In some examples, at least one communication protocol employed by the game controller 200 may be standardized. In some examples, at least one communication protocol employed by the game controller 200 may be proprietary. For example, the game controller 200 may be configured to use a proprietary communication protocol supported by the local gaming system 304 and use a standardized communication protocol for pairing with computers and devices from other manufacturers that do not utilize the proprietary protocol.

Non-limiting examples of communication protocols that the game controller 200 may be configured to use to communicate with different devices includes, but is not limited to, a low energy beaconing protocol, such as BLE, a wireless personal area network protocol, such as infrared data association (IrDA), wireless universal serial bus (USB), ZigBee, etc., near-me area network (NAN) protocols, or other low energy, low bandwidth wireless protocols that require two devices to be within a limited (e.g., <50 m) range to communicate, a wireless local area network (WLAN) protocol, such as WIFI (e.g., WIFI-direct) or other Institute of Electrical and Electronics Engineers (IEEE) 802.11 standard protocols (e.g., 802.11ax).

The game controller 200 may be configured to employ any suitable number of communication protocols and any suitable type of communication protocol including current and future communication protocols to communicate with any suitable number of different devices and any suitable different types of devices.

The communication interface 316 may implement multiple types of wireless or radio technologies to support such pairing/communication. For example, the communication interface 316 may implement multiple radios, such as a WIFI radio, a BLE radio, a cellular radio, and any other suitable type of radio or other communication hardware. In some implementations, the communication interface 316 may further include physical ports to facilitate a wired connection to a computer network (e.g., Universal Serial Bus), a gaming system, or another type of device.

In one example, the game controller 200 may be configured to pair with the companion device 302 using a first communication protocol, such as the BLE communication protocol. Further, the game controller 200 may be configured to pair with the local gaming system 304 using a second communication protocol different than the first communication protocol, such as a proprietary communication protocol incorporating aspects of a high-speed WAN protocol such as 802.11ax in conjunction with proprietary aspects outside the scope of the standardized WAN protocol. In some implementations, additionally or alternatively, the game controller 200 may be configured to pair with the local gaming system 304 using the first communication protocol (e.g., the BLE communication protocol). The game controller 200 may be configured to pair with the WAP 310 using a third communication protocol, such as a standardized WIFI-based communication protocol. In other examples, the game controller 200 may use the same communication protocol to pair with the local gaming system 304 and the WAP 310. The game controller 200 may pair with the WAP 310 using any suitable communication protocol.

Pairing with the WAP 310 may allow for the game controller to communicate with the remote cloud-based gaming system 312 without requiring an intermediate connection with a local gaming device, such as a game console, a desktop computer, or a smartphone. By pairing the game controller 200 with the remote cloud-based gaming system 312 via the WAP 310, the game controller 200 may be able to send user input control data to the remote cloud-based gaming system 312 more quickly than a configuration in which user input control data from the game controller 200 is relayed through the local gaming system 304 or computing device to the WAP 310.

Furthermore, when the game controller 200 is paired with the remote cloud-based gaming system 312, the remote cloud-based gaming system 312 may be configured to send rendered audio/video data for a video game executed by the remote cloud-based gaming system 312 to a local computing system for presentation. By allowing for the remote cloud-based gaming system 312 to handle execution of the video game, computing devices having lesser processing resources may still be able to present the video game locally which provides a user with greater flexibility to play the video game using different gaming systems.

As one example, the remote cloud-based gaming system 312 may send the rendered audio/video data for a video game executed by the remote cloud-based gaming system 312 to the streaming device 306 for presentation. As another example, the remote cloud-based gaming system 312 may send the audio/video data for a video game executed by the remote cloud-based gaming system 312 to the companion device 302 for presentation. The remote cloud-based gaming system 312 may send rendered audio/video data for a video game executed by the remote cloud-based gaming system 312 to any suitable computing system for presentation. Note that according to such a configuration, the game controller 200 need not be paired with the device that is presenting the rendered audio/video data for the video game executed by the remote cloud-based gaming system 312, because the game controller 200 is sending user input control data to the remote cloud-based gaming system 312 via the WAP 310.

The micro-controller 222 includes a logic subsystem 318 and a storage subsystem 320 including instructions executable to perform various pairing operations and related functionality. Further, the game controller 200 includes various features that aid a user in managing pairing of the game controller 200 with the different gaming systems in an intuitive, straight-forward, and easily observable manner. The storage subsystem 320 may include a pairing database 322 configured to store pairing data of computing devices with which the game controller 200 has previously paired. For example, such pairing data may include one or more of a specified communication protocol, credentials, passwords, pre-shared keys (PSKs), and service set identifier (SSID) information.

The pairing database 322 may be configured to store companion-device pairing data 324 that the game controller 200 may user to pair with the companion device 302. The companion-device pairing data 324 may be received by the game controller 200 and stored in the pairing database 322 based on an initial pairing of the game controller 200 and the companion device 302. The pairing database 322 may be configured to store gaming-system pairing data 326 that the game controller 200 may use to pair the game controller with a previously-paired gaming systems with which the game controller has been previously paired. The gaming-system pairing data 326 may be received by the game controller 200 and stored in the pairing database 322 based on an initial pairing of the game controller 200 with each of the previously-paired gaming systems.

In the illustrated example, the previously-paired gaming systems may include the local gaming system 304, the wireless access point 310, and the streaming device 306. In some examples where the companion device 302 is configured to execute both a companion pairing application program and a video game, the companion device 302 may act as a previously-paired gaming system as well.

The pairing database 322 on-board the game controller 200 provides flexibility for the game controller 200 to be quickly paired with different gaming systems using different communication protocols at different physical locations. For example, the pairing database 322 may store pairing data for a user's personal gaming system at home. Further, when the user plays video games on a friend's gaming system, the game controller 200 may be configured to store pairing data for the friend's gaming system. As such, even when the user goes back and forth between the user's own gaming system and the friend's gaming system, the game controller 200 may have the gaming-system pairing data stored on-board, so that the game controller 200 may quickly pair with either gaming system.

Pairing information for any suitable computing device may be stored in the pairing database 322, so that such pairing data can be used to quickly pair the game controller 200 with a specified previously-paired computing device wherever the game controller 200 is being used. In other words, the game controller 200 does not have to reacquire the pairing data from a gaming system each time the game controller 200 pairs with the gaming system. Further, the game controller 200 may be configured to store a last-paired gaming system 328 with which the game controller 200 was last paired in the pairing database 322.

In some implementations, the game controller 200 initially may attempt to pair with the companion device 302 at boot up/activation of the game controller 200. As such, the companion device 302 can be available to aid the game controller 200 in pairing with a gaming system. The game controller 200 may be configured to pair with the companion device using a first communication protocol, such as the BLE communication protocol.

If the game controller 200 is unable to pair with the companion device 302, then the game controller 200 may present an indication that there is a pairing error. As one example, an error notification may be visually presented via the display 220 of the game controller 200. As another example, the game controller 200 may vibrate haptic motors or blink lights of the game controller 200 to provide an indication of the pairing error. Such indications of a pairing error may be employed in an implementation of a game controller that lacks an integral display, for example.

Further, in some implementations, the game controller 200 may attempt to pair with the last-paired gaming system 328 stored in the pairing database 322 at boot-up/activation of the game controller 200. The game controller 200 may be configured in this manner, because there may be a high likelihood that a user would desire to use the game controller 200 with the last-paired gaming system 328 relative to other previously-paired gaming systems. The game controller 200 may attempt to pair with the last-paired gaming system 328 using a communication protocol specified by the gaming-system pairing data 326 stored in the pairing database 322.

In some examples, the communication protocol used to pair the game controller 200 with the last-paired gaming system 328 may be a second communication protocol that is different than the first communication protocol used by the game controller 200 to pair with the companion device 302.

The game controller 200 may be configured to determine whether the game controller 200 is able to pair with the last-paired gaming system 328. If the game controller 200 is able to pair with the last-paired gaming system 328, the game controller 200 may be configured to send, via the communication interface 316, user input control data to the last-paired gaming system 328 using the second communication protocol. The user input control data may be generated responsive to activation of a control 202 of the game controller 200. The user input control data may be used to control a video game that is executed by the last-paired gaming system 328.

On the other hand, the game controller 200 may be unable to pair with the last-paired gaming system 328. The game controller 200 may be unable to pair with the last-paired gaming system 328 for any of a variety of reasons. As one example, the last-paired gaming system 328 may be turned off. As another example, the last-paired gaming system 328 may be out of communication range of the game controller 200. As yet another example, the pairing-data for the last-paired gaming system 328 that is stored in the pairing database 322 may be out of date relative to the current pairing data for the last-paired gaming system 328.

If the game controller 200 is unable to pair with the last-paired gaming system 328, the game controller 200 may send, via the communication interface 316, an error notification to the companion device 302 using the first communication protocol. The error notification may indicate that the game controller 200 is unable to pair with the last-paired gaming system 328.

Figure 4:
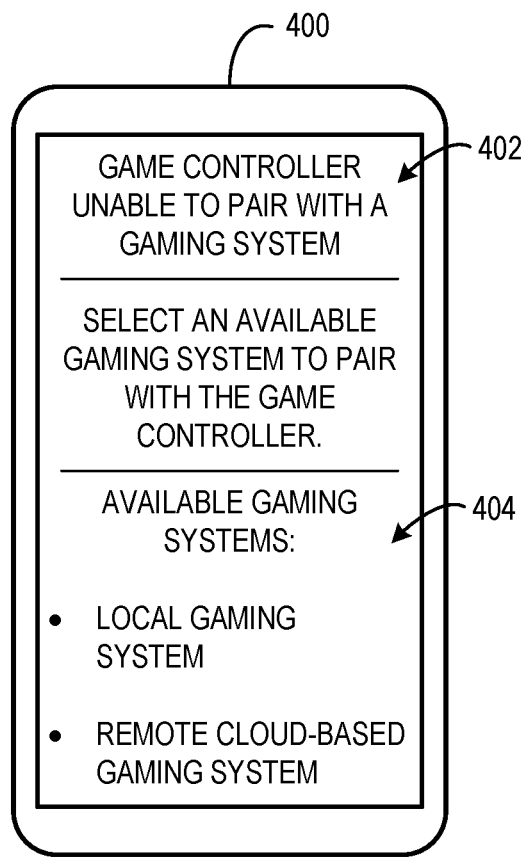
FIG. 4 shows an example companion device that is configured to aid a game controller in pairing with a gaming system.

FIG. 4 shows an example companion device implemented as a smartphone 400. The smartphone 400 may correspond to the companion device 302 of FIG. 3. The smartphone 400 may be paired with the game controller 200. The smartphone 400 visually presents an error message 402 based on receiving the error notification from the game controller 200. The error message 402 indicates that the game controller 200 is unable to pair with the last-paired gaming system 328.

In some implementations, the smartphone 400 may be configured to provide alternative or additional indications of the pairing error. In one example, the smartphone 400 may be configured to vibrate a haptic motor of the smartphone 400 to alert a user of the pairing error and/or the error message 402.

Further, the smartphone 400 may be configured to identify gaming systems that are available to be paired with the game controller 200. For example, the smartphone 400 may receive pairing requests and/or pairing data from different gaming systems that are available for pairing. The smartphone 400 may be configured to visually present a list 404 of recommended gaming systems that are available to pair with the game controller 200 based on the received pairing requests and/or pairing information. In the illustrated example, the list 404 includes the local gaming system and the remote cloud-based gaming system. The smartphone 400 may receive user input indicating selection of a gaming system from the list 404. The smartphone 400 may send pairing information for the selected recommended gaming system to the game controller 200 using the first communication protocol. Responsive to receiving the recommended-gaming-system pairing data from the smartphone 400, the game controller 200 may send a pairing request to the recommended gaming system using the recommended-gaming-system pairing data. In this way, the smartphone 400 may aid the game controller 200 in pairing with a gaming system that the game controller 200 otherwise may be unable to pair with alone.

Further, responsive to successful pairing with the recommended gaming system, the game controller 200 may be configured to store the recommended-gaming-system pairing data in the pairing database 322. Also, the game controller 200 may be configured to update the last-paired gaming system 328 to correspond to the recommended gaming system in the pairing database 322.

In some implementations, where the game controller 200 is attempting to pair with the remote cloud-based gaming system 312, the last-paired gaming system may be a wireless access point used to pair with the remote cloud-based gaming system 312. If the game controller 200 is unable to pair with the wireless access point stored as the last-paired gaming system, then the smartphone 400 may recommend using a different wireless access point to pair the game controller 200 with the remote cloud-based gaming system 312.

Returning to FIG. 3, in some implementations, the companion device 302 may include a global positioning system (GPS) device 330 that is configured to determine a location of the companion device 302. In some examples, the location of the companion device 302 may be determined using another approach, such as based on a WIFI network to which the companion device is connected.

The companion device 302 may be configured to use the determined location to recommend gaming systems to pair with the game controller 200. In some examples, gaming systems may be associated with corresponding locations based on having GPS devices or determining location information in another manner. The companion device 302 may be configured to determine which gaming systems (or associated WAPs in the case of the remote cloud-based gaming system) are closest to the location of the companion device 302. In some examples, the companion device 302 may recommend gaming systems that are within a threshold distance (e.g., a communication range of the game controller 200) of the companion device 302. In some examples, a gaming system that is closer to the location of the companion device 302 may be recommended over another gaming system that is further from the location of the companion device 302. The companion device 302 may use location information in any suitable manner to recommend gaming systems for pairing with the game controller 200. In one example, the companion device 302 (e.g., smart phone) may recognize a change in location and recommend a different local console to pair with the game controller or a different WAP to connect the game controller with the remote cloud-based gaming system 312 based on the change in location. Such a feature allows for a user to move the game controller 200 between platforms and devices in different locations and the game controller 200 may automatically pair with those devices with aid of the companion device 302.

In some implementations, the companion device 302 may be configured to pair with the local gaming system 304. Further, the companion device 302 may be configured to send location data generated based on signals from the GPS device 330 to the local gaming system 304. The local gaming system 304 may be configured to store the received location data. The local gaming system 304 may be configured to use the location data to identify various companion devices and/or game controllers that are near the location and available to pair with the local gaming system 304 to facilitate automatic pairing based on geolocation.

In some implementations, the game controller 200 optionally may automatically attempt to pair with a gaming system nearest to the location provided by the companion device 302 instead of attempting to pair with a last-paired gaming system. In other words, the availability of location data for pairing optionally may override the last-paired gaming system in the hierarchy of the pairing process.

In some implementations, when the game controller 200 is paired with the remote cloud-based gaming system 312 using cloud gaming, the location of companion device 302 may be sent to the remote cloud-based computing system 312 and the remote cloud-based computing system 312 may use the location to identify a streaming device proximate to the location of the game controller 200 to send rendered audio/video of a video game for presentation on the steaming device.

In some implementations, the companion device 302 may be configured to send location data generated based on signals from the GPS device 330 to the game controller 200. The game controller 200 may be configured to store the received location data 332 in the pairing database 322. The game controller 200 may be configured to use the location data 332 to identify and/or prioritize gaming systems that are available to pair with the game controller 200. By storing the location data 332 on-board the game controller 200, the location data 332 may be available even when the companion device 302 is not paired with the game controller 200.

Whenever location data is stored, accessed, and/or processed, the location data may be handled in accordance with privacy and/or security standards. Whenever location data is collected, the user owning the data should be notified, and the location data should only be collected with the utmost respect for user privacy (e.g., user data may be collected only when the user owning the data provides affirmative consent, and/or the user owning the data may be notified whenever the user data is collected). Users may opt-in and/or opt-out of location data collection at any time.

Figure 5A:
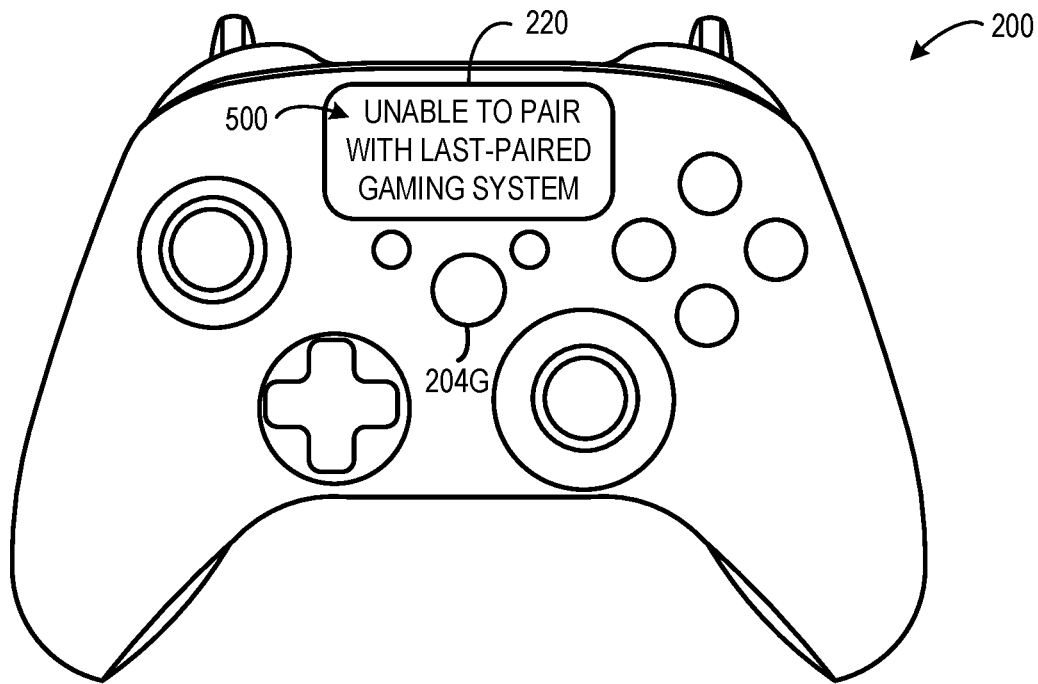
FIGS. 5A and 5B show different example pairing status notifications visually presented via a display of the game controller shown in FIGS. 2A and 2B.
Figure 5B:

In some implementations, the game controller 200 may be configured to visually present pairing status information via the display 220. FIGS. 5A-5B show example pairing status notifications that may be visually presented via the display of the game controller. In FIG. 5A, the game controller 200 may be configured to visually present a pairing error message 500 via the display 220 responsive to the game controller 200 being unable to pair with the last-paired gaming system. In FIG. 5B, the game controller 200 may be configured to visually present a pairing notification or a successful pairing message 502 responsive to the game controller 200 pairing with the local gaming system 304. In some examples, the successful pairing message may be visually presented based on the game controller pairing with a gaming system recommended by the companion device 302.

The game controller 200 may be configured to visually present any suitable pairing status information to indicate a pairing status of the game controller 200. In some examples, the game controller 200 may be configured to visually present pairing status information via the display 220 on-demand. For example, the game controller 200 may be configured to visually present pairing status information responsive to activation of a designated control of the game controller 200, such as a pairing button 204G.

In some implementations, the game controller 200 may be configured to visually present a list of available gaming systems with which the game controller 200 can be paired (e.g., similar to the list 404 visually presented by the smartphone 400 shown in FIG. 4). The game controller 200 may be configured to receive user input indicating selection of a gaming system from the list and send a pairing request to the selected gaming system using a communication protocol based on gaming system pairing data corresponding to the selected gaming system. In some implementations, when the remote-cloud based gaming system is selected, the game controller 200 may be configured to visually present a list of streaming devices to which the remote cloud-based gaming system may send rendered audio/video data for a video game executed by the remote cloud-based gaming system 312. The game controller 200 may be configured to receive user input indicating selection of a streaming device from the list and send a notification to the remote cloud-based gaming system to send the rendered audio/video data to the selected streaming device.

In some implementations, the game controller 200 may be configured to provide pairing "short-cuts" that allow for the game controller 200 to quickly pair with different gaming systems (or other computing devices). In particular, the game controller 200 may be configured to map different pairing functionality to different controls of the plurality of controls 202. The game controller 200 may be configured to store control mapping data 334 in the storage subsystem 320. The control mapping data 334 may indicate which of a plurality of different sets of one or more controls of the plurality of controls 202 are mapped to different previously-paired gaming systems stored in the pairing database 322. The control mapping data 334 specifies that when a particular set of control(s) is activated, the game controller 200 sends a pairing request to the gaming system that is mapped to the particular set of controls to pair the game controller with the gaming system.

Figure 6A:
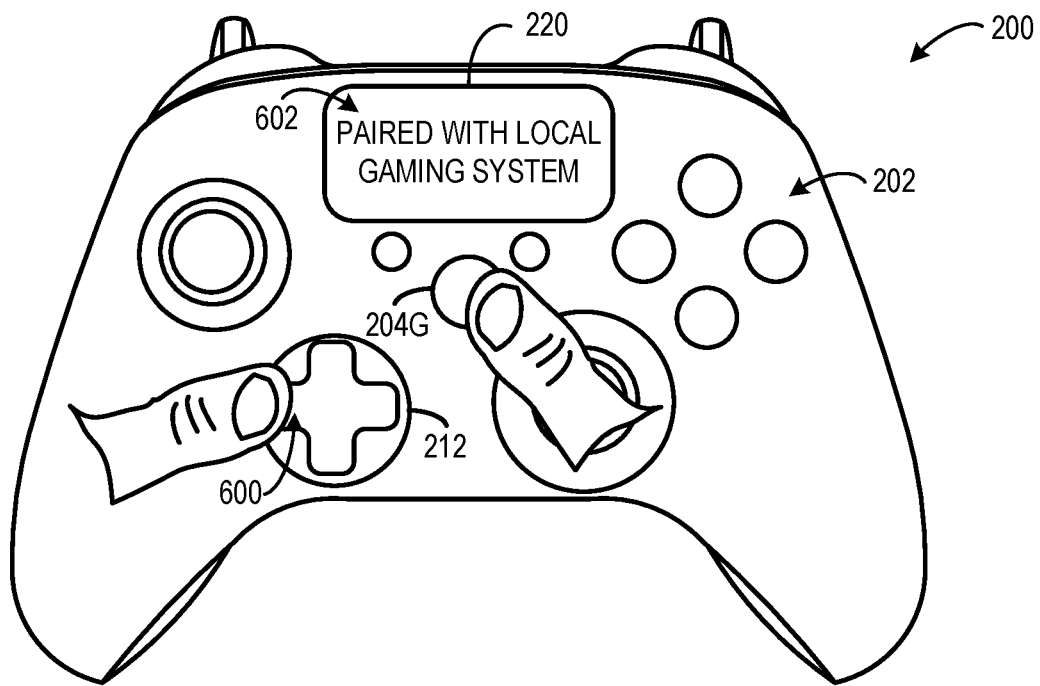
FIGS. 6A and 6B show different example scenarios where different sets of controls of the game controller of FIGS. 2A and 2B are mapped to different pairing functions for pairing the game controller with different gaming systems.
Figure 6B:
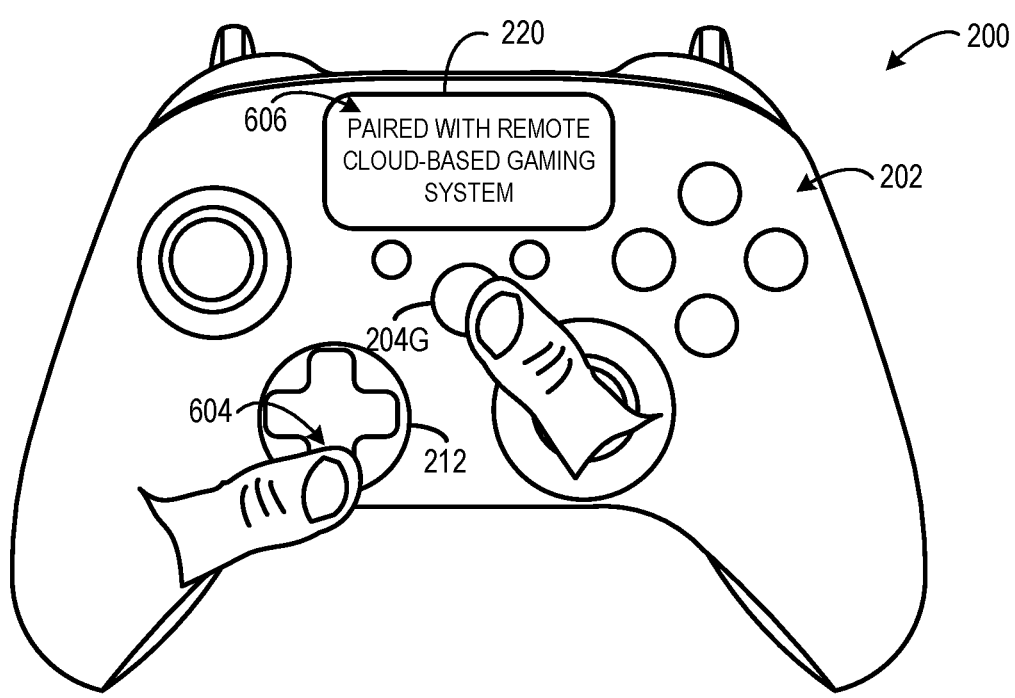

FIGS. 6A and 6B show example mappings of sets of controls of the game controller to different pairing functionality. In FIG. 6A, when a user presses the pairing button 204G while also pressing the left-direction 600 of the directional pad 212, the game controller 200 sends a pairing request to the local gaming system 304 using the communication protocol specified by the gaming-system pairing data 326. In this example, the pairing button 204G and the left-direction 600 of the directional pad 212 correspond to a first set of controls that is mapped to a pairing function for the local gaming system 304. The game controller 200 may be configured to visually present a pairing notification 602 indicating that the game controller is successfully paired with the local gaming system via the display 220.

In FIG. 6B, when a user presses the pairing button 204G while also pressing the down-direction 604 of the directional pad 212, the game controller 200 sends a pairing request to the remote cloud-based gaming system 312 via the WAP 310 using the communication protocol specified by the gaming-system pairing data 326. In this example, the pairing button 204G and the down-direction 604 of the directional pad 212 correspond to a second set of controls that is mapped to a pairing function for the remote cloud-based gaming system 312. The game controller 200 may be configured to visually present a pairing notification 606 indicating that the game controller is successfully paired with the remote cloud-based gaming system via the display 220.

In some implementations, when the second set of controls is activated to pair the gaming controller 200 with the remote cloud-based gaming system 312, the game controller 200 may be configured to visually present a list of streaming devices to which the remote cloud-based gaming system may send rendered audio/video data for a video game executed by the remote cloud-based gaming system 312. The game controller 200 may be configured to receive user input indicating selection of a streaming device from the list and send a notification to the remote cloud-based gaming system to send the rendered audio/video data to the selected streaming device.

In some implementations, pairing data for the WAP 310 may be stored in the pairing database 322 and the second set of controls may be mapped to a pairing function for the WAP 310 instead of the remote cloud-based gaming system 312.

In another example, a third set of controls may be mapped to the last-paired gaming system 328. In yet another example, a fourth set of controls may be mapped to a last device paired via the BLE communication protocol or the last WIFI-based communication protocol. In still yet another example, a fifth set of controls may be mapped to a last-paired WAP. Further, in some examples, the game controller

200 may be configured to visually present a list of streaming devices to which the remote cloud-based gaming system may send rendered audio/video data for a video game executed by the remote cloud-based gaming system 312. The game controller 200 may be configured to receive user input indicating selection of a streaming device from the list and send a notification to the remote cloud-based gaming system to send the rendered audio/video data to the selected streaming device.

The game controller 200 may be configured to map any suitable control or set of controls to any suitable pairing functionality for any suitable gaming system or other computing device (e.g., the companion device 302). In some implementations, the control mapping data 334 may be updated via the companion device 302 and the companion device 302 may send the updated control mapping data to the game controller 200. Further, the game controller 200 may store the updated control mapping data in the storage subsystem 320.

FIGS. 7-10 show an example method 700 for operating a game controller to pair with different gaming systems using different communication protocols. For example, the method 700 may be performed by the game controller 200 shown in FIGS. 2A, 2B, 3, 5A, 5B, 6A, and 6B, or generally any suitable game controller capable of proving such functionality described herein. In this example, the different gaming systems are limited to a local gaming system and a remote cloud-based gaming system, although method 700 is broadly applicable to pair the game controller to any suitable number of gaming systems. Further, in this example the number of communication protocols is limited to two. The method 700 is broadly applicable to pair the game controller with different computing devices using any suitable number of different communication protocols.

Figure 7:
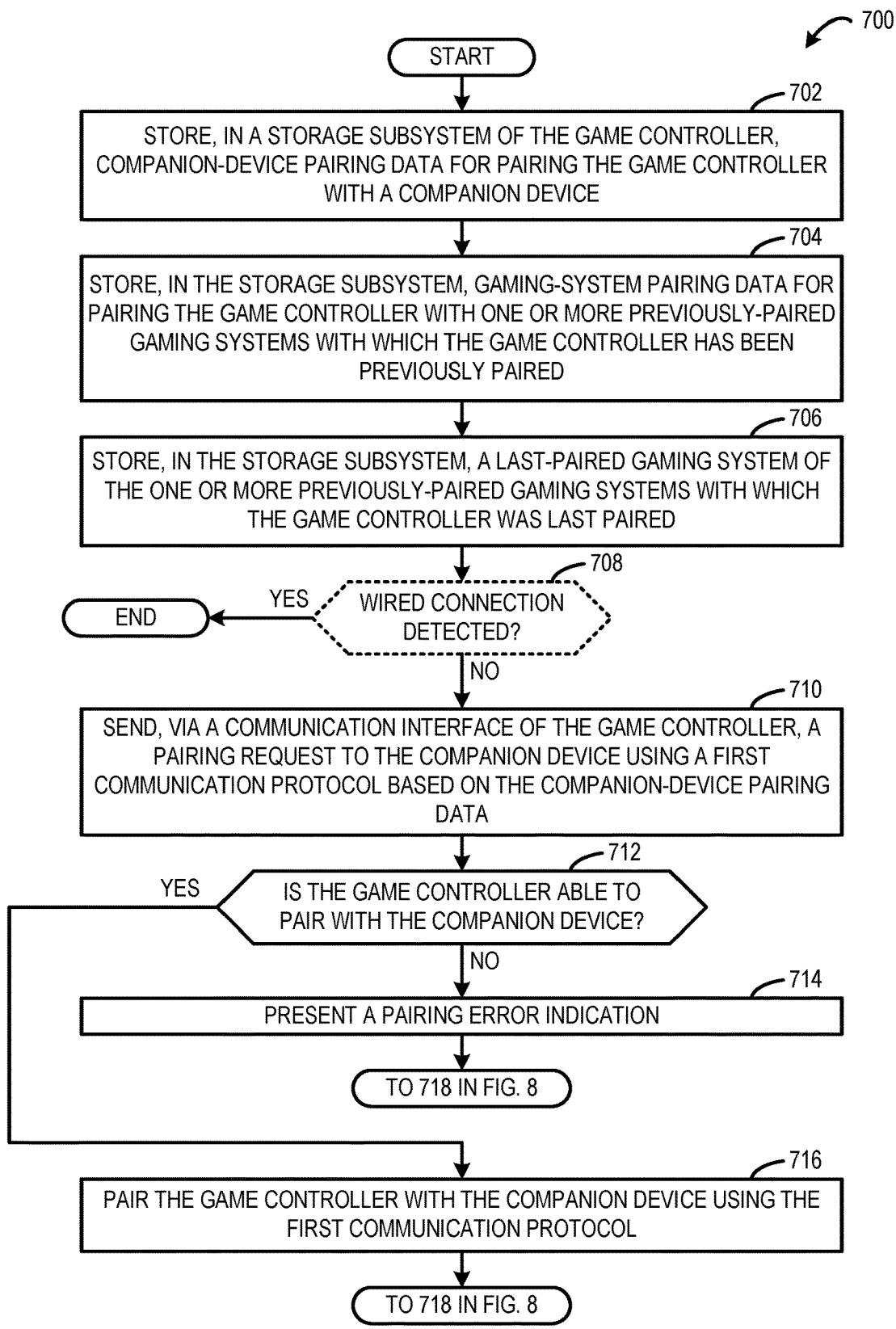
FIGS. 7-10 show an example method for operating a game controller to pair with different gaming system.

In FIG. 7, at 702, the method 700 includes storing, in a storage subsystem of the game controller, companion-device pairing data for pairing the game controller with a companion device using a first communication protocol. For example, the first communication protocol may include the BLE communication protocol.

At 704, the method 700 includes storing, in the storage subsystem, gaming-system pairing data for pairing the game controller with one or more previously-paired gaming systems with which the game controller has been previously paired.

At 706, the method 700 includes storing, in the storage subsystem, a last-paired gaming system of the one or more previously-paired gaming systems with which the game controller was last paired.

In some implementations, at 708, the method 700 optionally may include determining whether a wired connection between the game controller and a gaming system is detected. If a wired connection is detected, then the game controller may communicate with the gaming system via the wired connection and the method 700 ends. Otherwise, the method 700 moves to 710.

At 710, the method 700 includes sending, via a communication interface of the game controller, a pairing request to the companion device using a first communication protocol based on the companion-device pairing data.

At 712, the method 700 includes determining whether the game controller is able to pair with the companion device. If the game controller is able to pair with the companion device, then the method 700 moves to 716. Otherwise, the method 700 moves to 714.

At 714, the method 700 includes presenting a pairing error indication based on the game controller being unable to pair with the companion device. In implementations where the game controller includes a display, the pairing error indication may include visually presenting an error message via the display. In some examples, the pairing error indication may include vibrating a haptic motor, blinking lights, and/or outputting an audible "beep" from a speaker of the game controller. The game controller may be configured to present any suitable type of feedback indicating a pairing error between the game controller and the companion device. Upon the game controller presenting the pairing error indication, the method 700 moves to 718 in FIG. 8.

At 716, the method 700 includes pairing the game controller with the companion device using the first communication protocol. Upon the game controller pairing with the companion device, the method 700 moves to 718 in FIG. 8.

Figure 8:
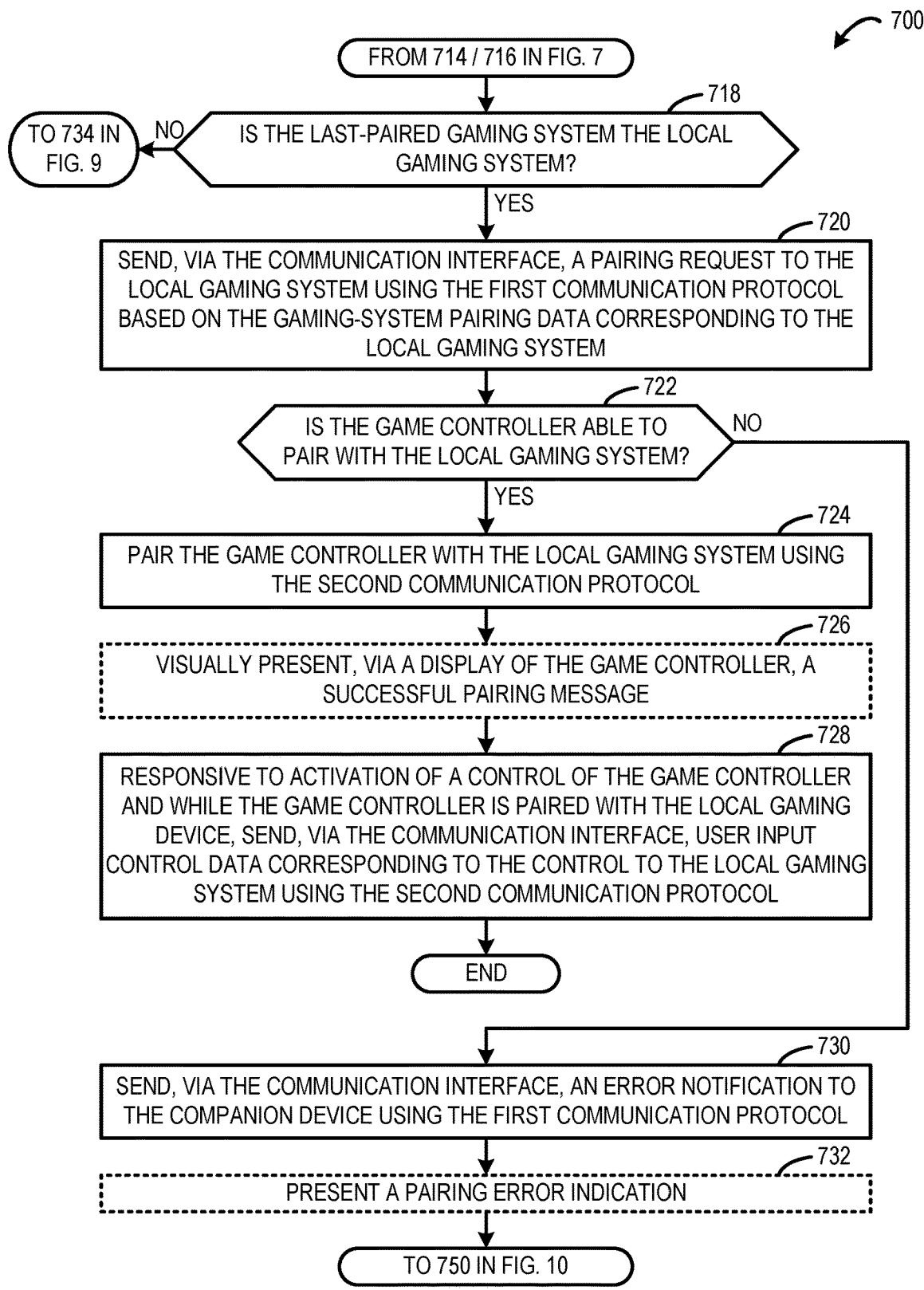

In FIG. 8, at 718, the method 700 includes determining whether the last-paired gaming system is the local gaming system. For example, the local gaming system may include a game console or a desktop computer that is in a same physical space as the game controller. If the last-paired gaming system is the local gaming system, then the method moves to 720. Otherwise, the method 700 moves to 734 in FIG. 9.

At 720, the method 700 includes sending, via the communication interface, a pairing request to the local gaming system using a second communication protocol based on the gaming-system pairing data for the local gaming system. In some examples, the second communication protocol may be different than the first communication protocol. For example, the second communication protocol may include a WIFI-based communication protocol.

At 722, the method 700 includes determining whether the game controller is able to pair with the local gaming system. If the game controller is able to pair with the local gaming system, then the method 700 moves to 724. Otherwise, the method 700 moves to 730.

At 724, the method 700 includes pairing the game controller with the local gaming system using the second communication protocol.

In some implementations, at 726, the method 700 optionally may include visually presenting, via a display of the game controller, a successful pairing message indicating that the game controller is successfully paired with the local gaming system. In some implementations, the companion device optionally may visually present the successful pairing message. For example, the companion device may visually present the successful pairing message in implementations where the game controller does not include a display. In some implementations, a display connected with the local gaming system may visually present the successful pairing message.

At 728, responsive to activation of a control of the game controller and while the game controller is paired with the local gaming system, the method 700 includes sending, via the communication interface, user input control data corresponding to the control to the local gaming system using the second communication protocol. The local gaming system may control execution of a video game based on the user input control data and the method 700 may end.

At 730, the method 700 includes based on the game controller being unable to pair with the local gaming system, sending, via the communication interface, an error notification to the companion device using the first communication protocol. The error notification may indicate that the game controller is unable to pair with the local gaming system. The companion device may be configured to present an error message indicating that the game controller is unable to pair with the local gaming system based on receiving the error notification.

In some implementations, at 732, the method 700 optionally may include presenting a pairing error indication based on the game controller being unable to pair with the local gaming system. In implementations where the game controller includes a display, the pairing error indication may include visually presenting an error message via the display. In some examples, the pairing error indication may include vibrating a haptic motor, blinking lights, and/or output an audible "beep" from a speaker of the game controller. The game controller may be configured to present any suitable type of feedback indicating a pairing error between the game controller and the local gaming system. Upon the game controller presenting the pairing error indication, the method 700 moves to 734 in FIG. 9.

Figure 9:
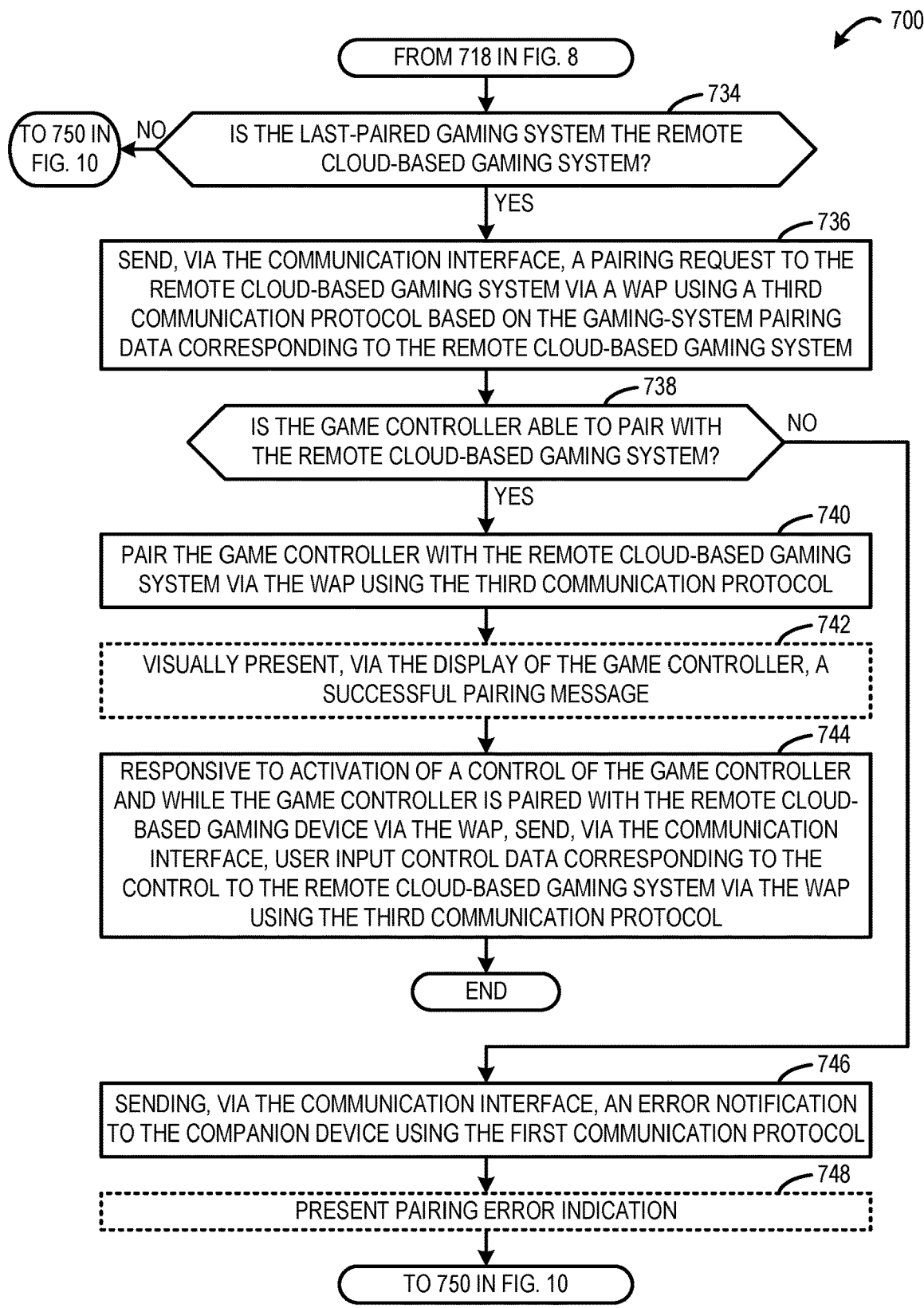

In FIG. 9, at 734, the method 700 includes determining whether the last-paired gaming system is the remote cloud-based gaming system. For example, the remote cloud-based gaming system may be in communication with a WAP having pairing data that is stored in the storage subsystem of the game controller. If the last-paired gaming system is the remote cloud-based gaming system, then the method moves to 736. Otherwise, neither the local gaming system nor the remote cloud-based gaming system correspond to the last-paired gaming system, and the method proceeds to 750 in FIG. 10.

At 736, the method 700 includes sending, via the communication interface, a pairing request to the remote cloud-based gaming system via a WAP using a third communication protocol based on the gaming-system pairing data for the local gaming system. The third communication protocol may be different than the first and second communication protocols.

At 738, the method 700 includes determining whether the game controller is able to pair with the remote cloud-based gaming system. If the game controller is able to pair with the remote cloud-based gaming system, then the method 700 moves to 740. Otherwise, the method 700 moves to 746.

At 740, the method 700 includes pairing the game controller with the remote cloud-based gaming system via the WAP using the third communication protocol.

In some implementations, at 742, the method 700 optionally may include visually presenting, via a display of the game controller, a successful pairing message indicating that the game controller is successfully paired with the remote cloud-based gaming system. In some implementations, the companion device optionally may visually present the successful pairing message. For example, the companion device may visually present the successful pairing message in implementations where the game controller does not include a display. In some implementations, a display of a streaming device to which the remote cloud-based gaming system is directed to send rendered audio/video data may visually present the successful pairing message.

At 744, responsive to activation of a control of the game controller and while the game controller is paired with the remote cloud-based gaming system via the WAP, the method 700 includes sending, via the communication interface, user input control data corresponding to the control to the remote cloud-based gaming system via the WAP using the third communication protocol. The remote cloud-based gaming system may control execution of a video game based on the user input control data. The remote cloud-based gaming system may render video game data and send the rendered video game data to a streaming device via the WAP using the third communication protocol. The streaming device may present the video game based on the rendered video game data and the method 700 may end.

At 746, the method 700 includes, based on the game controller being unable to pair with the remote cloud-based gaming system, sending, via the communication interface, an error notification to the companion device using the first communication protocol. The error notification may indicate that the game controller is unable to pair with the remote cloud-based gaming system. The companion device may be configured to present an error message indicating that the game controller is unable to pair with the remote cloud-based gaming system based on receiving the error notification.

In some implementations, at 748, the method 700 optionally may include presenting a pairing error indication based on the game controller being unable to pair with the remote cloud-based gaming system. In implementations where the game controller includes a display, the pairing error indication may include visually presenting an error message via the display. In some examples, the pairing error indication may include vibrating a haptic motor, blinking lights, and/or output an audible "beep" from a speaker of the game controller. The game controller may be configured to present any suitable type of feedback indicating a pairing error between the game controller and the local gaming system. Upon the game controller presenting the pairing error indication, the method 700 moves to 750 in FIG. 10.

Figure 10:
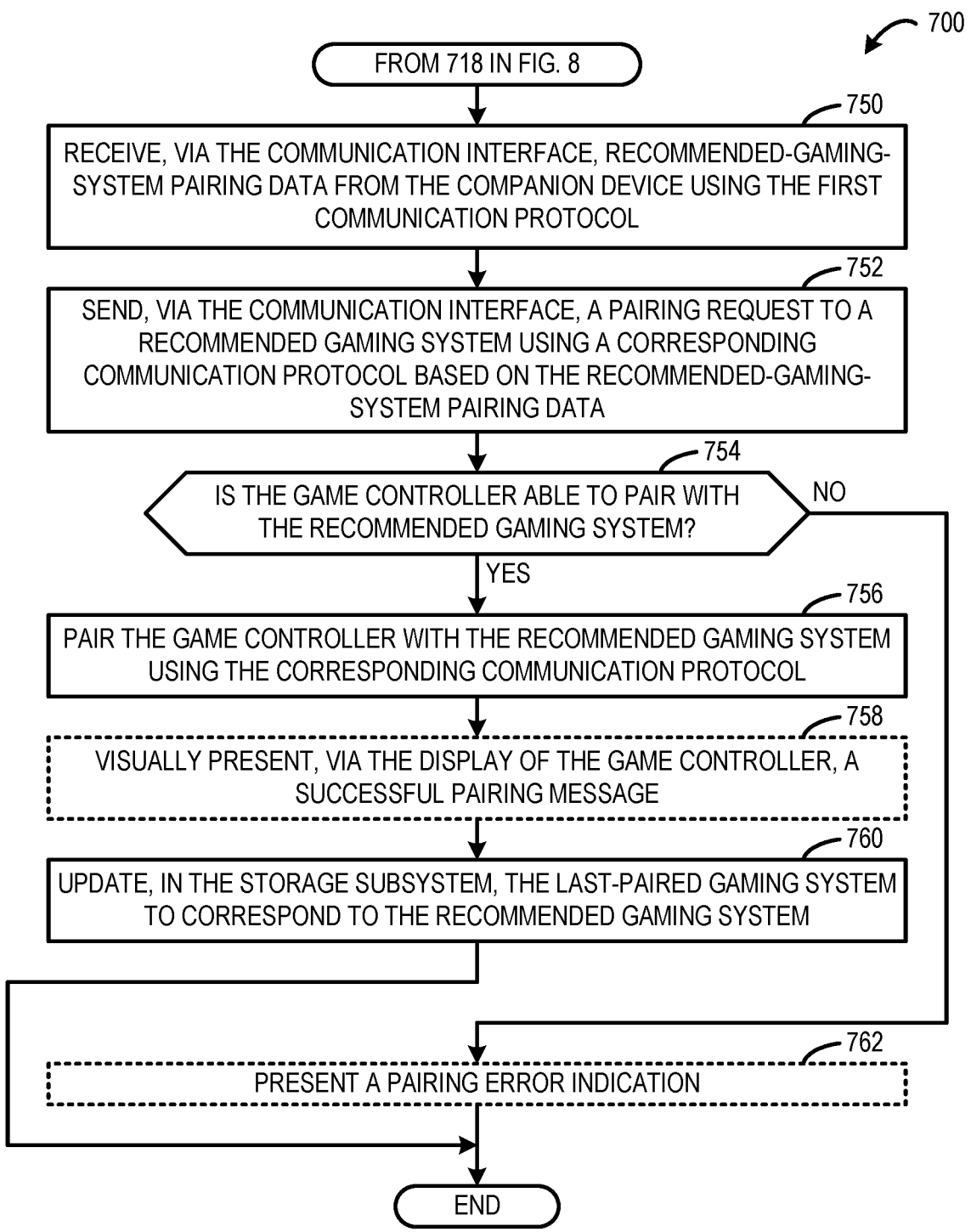

In FIG. 10, at 750, the method 700 includes receiving, via the communication interface, recommended-gaming-system pairing data from the companion device using the first communication protocol. The recommended-gaming-system pairing data corresponds to a gaming system recommended by the companion device for which to pair with the game controller. The recommended-gaming-system pairing data may identify a communication protocol corresponding to the recommended gaming system that the game controller may use to pair with the recommended gaming system. The companion device may recommend the gaming system in any suitable manner. In one example, the recommended gaming system may be selected based on user input to the companion device. In another example, the recommended gaming system may be determined based on a location of the recommended gaming system relative to a location of the game controller and/or the companion device.

In some implementations, the method 700 optionally may include automatically attempting to pair the game controller with a recommended gaming system (e.g., steps 750-756) ahead of attempting to pair the game controller with the last-paired gaming system (e.g., steps 718-224). In such implementations, if the game controller is unable to pair with the recommended gaming system, then the game controller may attempt to pair with the last-paired game controller.

At 752, the method 700 includes sending, via the communication interface, a pairing request to the recommended gaming system using the corresponding communication protocol based on the recommended-gaming system pairing data.

At 754, the method 700 includes determine whether the game controller is able to pair with the recommended gaming system. If the game controller is able to pair with the recommended gaming system, then the method 700 moves to 756. Otherwise, the method 700 moves to 762.

At 756, the method 700 includes pairing the gaming controller with the recommended gaming system using the corresponding communication protocol.

In some implementations, at 758, the method 700 optionally may include visually presenting, via the display of the game controller, a successful pairing message indicating that the game controller successfully paired with the recommended gaming system.

At 758, the method 700 includes updating, in the storage subsystem, the last-paired gaming system to correspond to the recommended gaming system. Accordingly, the next time that the game controller is turned on, the game controller may attempt to pair with the recommended gaming system. Upon updating the last-paired gaming system in the storage subsystem the method 700 may end.

At 762, the method optionally may include presenting a pairing error indication based on being unable to pair with the recommended gaming system. In some implementations, additionally or alternatively the companion device may present the pairing error indication. Upon the game controller presenting the pairing error indication, the method 700 may end.

The method 700 may be performed to allow for a companion device to aid the game controller in pairing with different gaming systems in an intuitive, straight-forward, and easily observable manner. The companion device may leverage the additional features and functions of the companion device (e.g., display, more functional/extensive user interface, programmability, and location tracking, among others) that are lacking from the game controller to extend the pairing functionality of the game controller.

In some implementations, the methods and processes described herein may be tied to a computing system of one or more computing devices. In particular, such methods and processes may be implemented as a computer-application program or service, an application-programming interface (API), a library, and/or other computer-program product.

Figure 11:
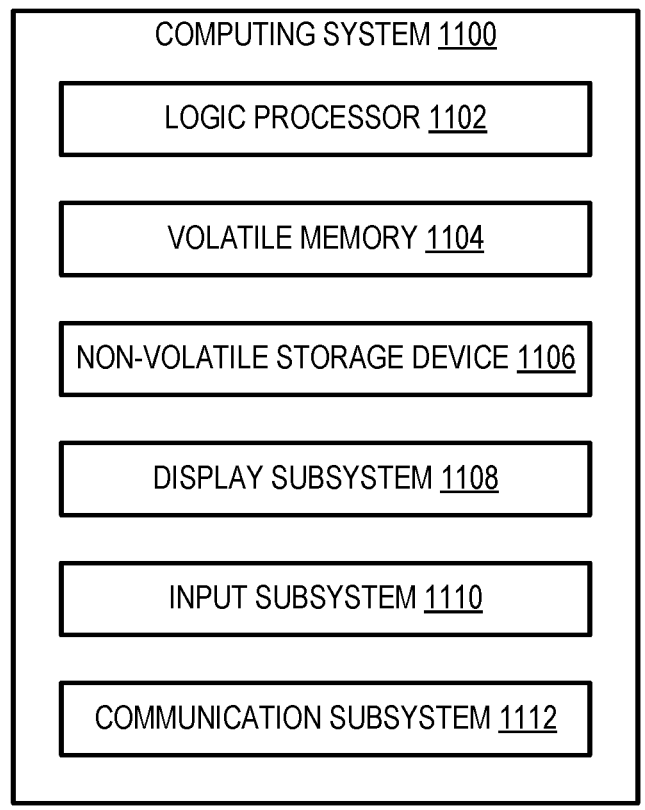
FIG. 11 shows an example computing system.

FIG. 11 schematically shows a non-limiting implementation of a computing system 1100 that can enact one or more of the methods and processes described above. Computing system 1100 is shown in simplified form. Computing system 1100 may embody the game console 100 shown in FIG. 1A, the tablet computer 108 shown in FIG. 1B, the game controller 200 shown in FIGS. 2A, 2B, 3, 5A, 5B, 6A, and 6B, the companion device 302, the local gaming system 304, the streaming device 306, the wireless access point 310, or the remote cloud-based gaming system 312 shown in FIG. 3, and/or the smartphone 400 shown in FIG. 4. Computing system 1100 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches, backpack host computers, and head-mounted augmented/mixed virtual reality devices.

Computing system 1100 includes a logic processor 1102, volatile memory 1104, and a non-volatile storage device 1106. Computing system 1100 may optionally include a display subsystem 1108, input subsystem 1110, communication subsystem 1112, and/or other components not shown in FIG. 11.

Logic processor 1102 also referred to herein as logic subsystem includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1102 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 may include physical devices that are removable and/or built-in. Non-volatile storage device 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1106 may include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 may include physical devices that include random access memory. Volatile memory 1104 is typically utilized by logic processor 1102 to temporarily store information during processing of software instructions. It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

In some implementations, aspects of the volatile memory 1104 and/or the non-volatile storage device 1106 may be referred to as a storage subsystem.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic processor 1102, volatile memory 1104, and/or non-volatile storage device 1106 in a shared enclosure, or such display devices may be peripheral display devices.

When included, input subsystem 1110 may comprise or interface with one or more user-input devices such as a keyboard, mouse, touch screen, microphone for speech and/or voice recognition, a camera (e.g., a webcam), or game controller.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network, such as a HDMI over WIFI connection. In some implementations, the communication subsystem may allow computing system 1100 to send and/or receive messages to and/or from other devices via a network such as the Internet.

In an example, a game controller, comprises a plurality of controls, a communication interface configured to selectively pair the game controller with a companion device using a first communication protocol, and one or more gaming systems using a second communication protocol, a logic subsystem, and a storage subsystem holding instructions executable by the logic subsystem to store, in the storage subsystem, companion-device pairing data for pairing the game controller with the companion device using the first communication protocol, store, in the storage subsystem, gaming-system pairing data for pairing the game controller with one or more previously-paired gaming systems with which the game controller has been previously paired using the second communication protocol, store, in the storage subsystem, a last-paired gaming system, of the one or more previously-paired gaming systems, with which the game controller was last paired, send, via the communication interface, a pairing request to the companion device using the second communication protocol based on the companion device pairing data, send, via the communication interface, a pairing request to the last-paired gaming system using the second communication protocol based on the gaming-system pairing data, responsive to activation of a control of the plurality controls and while the game controller is paired with the last-paired gaming system, send, via the communication interface, user input control data corresponding to the control to the last-paired gaming system using the second communication protocol, and responsive to the game controller being unable to pair with the last-paired gaming system and while the game controller is paired with the companion device, send, via the communication interface, an error notification to the companion device using the first communication protocol, the error notification indicating that the game controller is unable to pair with the last-paired gaming system, the companion device configured to present an error message indicating that the game controller is unable to pair with the last-paired gaming system based on receiving the error notification. In this example and/or other examples, the first communication protocol may include a Bluetooth Low Energy (BLE) communication protocol. In this example and/or other examples, the second communication protocol may include an 802.11ax wireless local area network (WLAN) communication protocol. In this example and/or other examples, the instructions may be executable by the logic subsystem to receive, via the communication interface, recommended-gaming-system pairing data from the companion device using the first communication protocol, the recommended-gaming-system pairing data for pairing the game controller with a recommended gaming system that is specified by the companion device, and send, via the communication interface, a pairing request to the recommended gaming system using a communication protocol corresponding to the recommended gaming system based on the recommended gaming-system pairing data. In this example and/or other examples, the instructions may be executable by the logic subsystem to responsive to the game controller pairing with the recommended gaming system, store, in the storage subsystem, the recommended-gaming-system pairing data, and update, in the storage subsystem, the last-paired gaming system to correspond to the recommended gaming system. In this example and/or other examples, the companion device may include a global positioning system (GPS) device configured to determine a location of the companion device, and the recommended gaming system may be specified by the companion device based on a location of the recommended gaming system or a location of an associated wireless access point for accessing the recommended gaming system relative to the location of the companion device. In this example and/or other examples, the recommended gaming system may be a remote cloud-based gaming system, and the recommended-gaming-system pairing data may be for pairing the game controller with the remote cloud-based gaming system via a wireless access point. In this example and/or other examples, the instructions may be executable by the logic subsystem to responsive to activation of a control of the plurality controls and while the game controller is paired with the remote cloud-based gaming system via the wireless access point, send, via the communication interface, user input control data corresponding to the control to the remote cloud-based gaming system via the wireless access point using the corresponding communication protocol. In this example and/or other examples, the game controller may further comprise a display, and the instructions may be executable by the logic subsystem to responsive to the game controller being unable to pair with the last-paired gaming system, visually present, via the display, a pairing error message indicating that the game controller is unable to pair with the last-paired gaming system. In this example and/or other examples, the gaming-system pairing data may include one or more of credentials, passwords, pre-shared keys (PSKs), and service set identifier (SSID) information.

In another example, a method for operating a game controller comprises storing, in a storage subsystem of the game controller, companion-device pairing data for pairing the game controller with a companion device using a first communication protocol, storing, in the storage subsystem, gaming-system pairing data for pairing the game controller with one or more previously-paired gaming systems with which the game controller has been previously paired using a second communication protocol, storing, in the storage subsystem, a last-paired gaming system of the one or more previously-paired gaming systems with which the game controller was last paired, sending, via a communication interface of the game controller, a pairing request to the companion device using the first communication protocol based on the companion device pairing data, determining whether the game controller is able to pair with the companion device, based on the game controller being able to pair with the companion device, pairing the game controller with the companion device using the first communication protocol, sending, via the communication interface, a pairing request to the last-paired gaming system using the second communication protocol based on the gaming-system pairing data, determining whether the game controller is able to pair with the last-paired gaming system, based on the game controller being able to pair with the last-paired gaming system, pairing the game controller with the last-paired gaming system using the second communication protocol, responsive to activation of a control of the game controller and while the game controller is paired with the last-paired gaming system, sending, via the communication interface, user input control data corresponding to the control to the last-paired gaming system using the second communication protocol, and based on the game controller being unable to pair with the last-paired gaming system, sending, via the communication interface, an error notification to the companion device using the first communication protocol, the error notification indicating that the game controller is unable to pair with the last-paired gaming system, the companion device configured to present an error message indicating that the game controller is unable to pair with the last-paired gaming system based on receiving the error notification. In this example and/or other examples, the method may further comprise receiving, via the communication interface, recommended-gaming-system pairing data from the companion device using the first communication protocol, the recommended-gaming-system pairing data for pairing the game controller with a recommended gaming system that is specified by the companion device, and sending, via the communication interface, a pairing request to the recommended gaming system using a communication protocol corresponding to the recommended gaming system based on the recommended gaming-system pairing data. In this example and/or other examples, the method may further comprise responsive to the game controller pairing with the recommended gaming system, storing, in the storage subsystem, the recommended-gaming-system pairing data, and updating, in the store subsystem, the last-paired gaming system to correspond to the recommended gaming system. In this example and/or other examples, the companion device may include a global positioning system (GPS) device configured to determine a location of the companion device, and the recommended gaming system may be specified by the companion device based on a location of the recommended gaming system or a location of an associated wireless access point for accessing the recommended gaming system relative to the location of the companion device. In this example and/or other examples, the recommended gaming system may be a remote cloud-based gaming system, and the recommended-gaming-system pairing data may be for pairing the game controller with the remote cloud-based gaming system via a wireless access point. In this example and/or other examples, the method may further comprise responsive to activation of a control of the game controller and while the game controller is paired with the remote cloud-based gaming system via the wireless access point, sending, via the communication interface, user input control data corresponding to the control to the remote cloud-based gaming system via the wireless access point using the corresponding communication protocol. In this example and/or other examples, the method may further comprise responsive to the game controller being unable to pair with the last-paired gaming system, visually present, via a display of the game controller, a pairing error message indicating that the game controller is unable to pair with the last-paired gaming system.

In yet another example, a method for operating a game controller comprises storing, in a storage subsystem of the game controller, companion-device pairing data for pairing the game controller with a companion device using a first communication protocol, storing, in the storage subsystem, gaming-system pairing data for pairing the game controller with one or more previously-paired gaming systems with which the game controller has been previously paired, the one or more previously-paired gaming systems including a remote cloud-based gaming system with which the game controller has been previously paired via a wireless access point, storing, in the storage subsystem, a last-paired gaming system of the one or more previously-paired gaming systems with which the game controller was last paired, wherein the last-paired gaming system corresponds to the remote cloud-based gaming system, sending, via a communication interface of the game controller, a pairing request to the companion device using the first communication protocol based on the companion device pairing data, based on the game controller being able to pair with the companion device, pairing the game controller with the companion device using the first communication protocol, sending, via the communication interface, a pairing request to the remote cloud-based gaming system via the wireless access point using a second protocol based on the remote cloud-based gaming system corresponding to the last-paired gaming system, determining whether the game controller is able to pair with the remote cloud-based gaming system via the wireless access point, based on the game controller being able to pair with the remote cloud-based gaming system, pairing the game controller with the remote cloud-based gaming system via the wireless access point using the second communication protocol, responsive to activation of a control of the game controller and while the game controller is paired with the remote cloud-based gaming system, sending, via the communication interface, user input control data corresponding to the control to the remote cloud-based gaming system via the wireless access point using the second communication protocol, and based on the game controller being unable to pair with the remote cloud-based gaming system, sending, via the communication interface, an error notification to the companion device using the first communication protocol, the error notification indicating that the game controller is unable to pair with the remote cloud-based gaming system, the companion device configured to present an error message indicating that the game controller is unable to pair with the remote cloud-based gaming system based on receiving the error notification. In this example and/or other examples, the method may further comprise receiving, via the communication interface, recommended-gaming-system pairing data from the companion device using the first communication protocol, the recommended-gaming-system pairing data for pairing the game controller with the remote cloud-based gaming system via a different wireless access point that is specified by the companion device, and sending, via the communication interface, a pairing request to the different wireless access point using a communication protocol corresponding to the different wireless access point based on the recommended gaming-system pairing data. In this example and/or other examples, the remote cloud-based gaming system may be configured to render audio/video data for a video game executed by the remote cloud-based gaming system based on the user input control data received from the game controller, and the remote cloud-based gaming system may be configured to send the rendered audio/video data for the video game to a streaming device via the wireless access point, and wherein the streaming device is configured to present the rendered audio/video data for the video game.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A game controller, comprising:
a plurality of controls;
a communication interface configured to selectively pair the game controller with:
    a companion device using a first communication protocol, and
    one or more gaming systems using a second communication protocol;
a logic subsystem; and
a storage subsystem holding instructions executable by the logic subsystem to:
    store, in the storage subsystem, companion-device pairing data for pairing the game controller with the companion device using the first communication protocol;
    store, in the storage subsystem, gaming-system pairing data for pairing the game controller with one or more previously-paired gaming systems with which the game controller has been previously paired using the second communication protocol;
    store, in the storage subsystem, a last-paired gaming system, of the one or more previously-paired gaming systems, with which the game controller was last paired;
    send, via the communication interface, a pairing request to the companion device using the second communication protocol based on the companion device pairing data;
    send, via the communication interface, a pairing request to the last-paired gaming system using the second communication protocol based on the gaming-system pairing data;
    responsive to activation of a control of the plurality controls and while the game controller is paired with the last-paired gaming system, send, via the communication interface, user input control data corresponding to the control to the last-paired gaming system using the second communication protocol; and
    responsive to the game controller being unable to pair with the last-paired gaming system and while the game controller is paired with the companion device, send, via the communication interface, an error notification to the companion device using the first communication protocol, the error notification indicating that the game controller is unable to pair with the last-paired gaming system, the companion device configured to present an error message indicating that the game controller is unable to pair with the last-paired gaming system based on receiving the error notification.

2. The game controller of claim 1, wherein the first communication protocol includes a Bluetooth Low Energy (BLE) communication protocol.

3. The game controller of claim 1, wherein the second communication protocol includes an 802.11ax wireless local area network (WLAN) communication protocol.

4. The game controller of claim 1, wherein the instructions are executable by the logic subsystem to:
receive, via the communication interface, recommended-gaming-system pairing data from the companion device using the first communication protocol, the recommended-gaming-system pairing data for pairing the game controller with a recommended gaming system that is specified by the companion device; and
send, via the communication interface, a pairing request to the recommended gaming system using a communication protocol corresponding to the recommended gaming system based on the recommended gaming-system pairing data.

5. The game controller of claim 4, wherein the instructions are executable by the logic subsystem to:
responsive to the game controller pairing with the recommended gaming system, store, in the storage subsystem, the recommended-gaming-system pairing data; and
update, in the storage subsystem, the last-paired gaming system to correspond to the recommended gaming system.

6. The game controller of claim 4, wherein the companion device includes a global positioning system (GPS) device configured to determine a location of the companion device, and wherein the recommended gaming system is specified by the companion device based on a location of the recommended gaming system or a location of an associated wireless access point for accessing the recommended gaming system relative to the location of the companion device.

7. The game controller of claim 4, wherein the recommended gaming system is a remote cloud-based gaming system, and wherein the recommended-gaming-system pairing data is for pairing the game controller with the remote cloud-based gaming system via a wireless access point.

8. The game controller of claim 7, wherein the instructions are executable by the logic subsystem to:
responsive to activation of a control of the plurality controls and while the game controller is paired with the remote cloud-based gaming system via the wireless access point, send, via the communication interface, user input control data corresponding to the control to the remote cloud-based gaming system via the wireless access point using the corresponding communication protocol.

9. The game controller of claim 1, further comprising a display, and wherein the instructions are executable by the logic subsystem to:
responsive to the game controller being unable to pair with the last-paired gaming system, visually present, via the display, a pairing error message indicating that the game controller is unable to pair with the last-paired gaming system.

10. The game controller of claim 1, wherein the gaming-system pairing data includes one or more of credentials, passwords, pre-shared keys (PSKs), and service set identifier (SSID) information.

11. A method for operating a game controller, the method comprising:
   storing, in a storage subsystem of the game controller, companion-device pairing data for pairing the game controller with a companion device using a first communication protocol;
   storing, in the storage subsystem, gaming-system pairing data for pairing the game controller with one or more previously-paired gaming systems with which the game controller has been previously paired using a second communication protocol;
   storing, in the storage subsystem, a last-paired gaming system of the one or more previously-paired gaming systems with which the game controller was last paired;
   sending, via a communication interface of the game controller, a pairing request to the companion device using the first communication protocol based on the companion device pairing data;
   determining whether the game controller is able to pair with the companion device;
   based on the game controller being able to pair with the companion device, pairing the game controller with the companion device using the first communication protocol;
   sending, via the communication interface, a pairing request to the last-paired gaming system using the second communication protocol based on the gaming-system pairing data;
   determining whether the game controller is able to pair with the last-paired gaming system;
   based on the game controller being able to pair with the last-paired gaming system, pairing the game controller with the last-paired gaming system using the second communication protocol;
   responsive to activation of a control of the game controller and while the game controller is paired with the last-paired gaming system, sending, via the communication interface, user input control data corresponding to the control to the last-paired gaming system using the second communication protocol; and
   based on the game controller being unable to pair with the last-paired gaming system, sending, via the communication interface, an error notification to the companion device using the first communication protocol, the error notification indicating that the game controller is unable to pair with the last-paired gaming system, the companion device configured to present an error message indicating that the game controller is unable to pair with the last-paired gaming system based on receiving the error notification.

12. The method of claim 11, further comprising:
   receiving, via the communication interface, recommended-gaming-system pairing data from the companion device using the first communication protocol, the recommended-gaming-system pairing data for pairing the game controller with a recommended gaming system that is specified by the companion device; and
   sending, via the communication interface, a pairing request to the recommended gaming system using a communication protocol corresponding to the recommended gaming system based on the recommended gaming-system pairing data.

13. The method of claim 12, further comprising:
   responsive to the game controller pairing with the recommended gaming system, storing, in the storage subsystem, the recommended-gaming-system pairing data; and
   updating, in the store subsystem, the last-paired gaming system to correspond to the recommended gaming system.

14. The method of claim 12, wherein the companion device includes a global positioning system (GPS) device configured to determine a location of the companion device, and wherein the recommended gaming system is specified by the companion device based on a location of the recommended gaming system or a location of an associated wireless access point for accessing the recommended gaming system relative to the location of the companion device.

15. The method of claim 12, wherein the recommended gaming system is a remote cloud-based gaming system, and wherein the recommended-gaming-system pairing data is for pairing the game controller with the remote cloud-based gaming system via a wireless access point.

16. The method of claim 15, further comprising:
   responsive to activation of a control of the game controller and while the game controller is paired with the remote cloud-based gaming system via the wireless access point, sending, via the communication interface, user input control data corresponding to the control to the remote cloud-based gaming system via the wireless access point using the corresponding communication protocol.

17. The method of claim 12, further comprising:
   responsive to the game controller being unable to pair with the last-paired gaming system, visually present, via a display of the game controller, a pairing error message indicating that the game controller is unable to pair with the last-paired gaming system.

18. A method for operating a game controller, the method comprising:
   storing, in a storage subsystem of the game controller, companion-device pairing data for pairing the game controller with a companion device using a first communication protocol;
   storing, in the storage subsystem, gaming-system pairing data for pairing the game controller with one or more previously-paired gaming systems with which the game controller has been previously paired, the one or more previously-paired gaming systems including a remote cloud-based gaming system with which the game controller has been previously paired via a wireless access point;
   storing, in the storage subsystem, a last-paired gaming system of the one or more previously-paired gaming systems with which the game controller was last paired, wherein the last-paired gaming system corresponds to the remote cloud-based gaming system;
   sending, via a communication interface of the game controller, a pairing request to the companion device using the first communication protocol based on the companion device pairing data;
   based on the game controller being able to pair with the companion device, pairing the game controller with the companion device using the first communication protocol;
   sending, via the communication interface, a pairing request to the remote cloud-based gaming system via the wireless access point using a second protocol based on the remote cloud-based gaming system corresponding to the last-paired gaming system;

determining whether the game controller is able to pair with the remote cloud-based gaming system via the wireless access point;

based on the game controller being able to pair with the remote cloud-based gaming system, pairing the game controller with the remote cloud-based gaming system via the wireless access point using the second communication protocol;

responsive to activation of a control of the game controller and while the game controller is paired with the remote cloud-based gaming system, sending, via the communication interface, user input control data corresponding to the control to the remote cloud-based gaming system via the wireless access point using the second communication protocol; and based on the game controller being unable to pair with the remote cloud-based gaming system, sending, via the communication interface, an error notification to the companion device using the first communication protocol, the error notification indicating that the game controller is unable to pair with the remote cloud-based gaming system, the companion device configured to present an error message indicating that the game controller is unable to pair with the remote cloud-based gaming system based on receiving the error notification.

19. The method of claim 18, further comprising:
receiving, via the communication interface, recommended-gaming-system pairing data from the companion device using the first communication protocol, the recommended-gaming-system pairing data for pairing the game controller with the remote cloud-based gaming system via a different wireless access point that is specified by the companion device; and sending, via the communication interface, a pairing request to the different wireless access point using a communication protocol corresponding to the different wireless access point based on the recommended gaming-system pairing data.

20. The method of claim 18, wherein the remote cloud-based gaming system is configured to render audio/video data for a video game executed by the remote cloud-based gaming system based on the user input control data received from the game controller, and wherein the remote cloud-based gaming system is configured to send the rendered audio/video data for the video game to a streaming device via the wireless access point, and wherein the streaming device is configured to present the rendered audio/video data for the video game.

* * * * *